US008226057B2

(12) United States Patent  (10) Patent No.: US 8,226,057 B2
Ao et al.  (45) Date of Patent: Jul. 24, 2012

(54) FIXING DEVICE FOR A HOLDING POLE

(75) Inventors: Feng Ao, Shenzhen (CN); Junwei Pan, Shenzhen (CN); Bin Wang, Shenzhen (CN); Haiping Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/159,350

(22) Filed: Jun. 13, 2011

(65) Prior Publication Data

US 2011/0233373 A1  Sep. 29, 2011

Related U.S. Application Data

(63) Continuation of application No. PCT/CN2009/075606, filed on Dec. 15, 2009.

(30) Foreign Application Priority Data

Dec. 19, 2008 (CN) .......................... 2008 1 0220168

(51) Int. Cl.
*A47B 96/00* (2006.01)
(52) U.S. Cl. .................................................. 248/218.4
(58) Field of Classification Search ............... 248/218.4, 248/219.1, 219.4, 229.1, 229.11, 229.21, 248/230.2, 230.9, 231.31, 534, 535, 540, 248/541, 74.1, 74.4
See application file for complete search history.

(56) References Cited

U.S. PATENT DOCUMENTS

| 4,998,691 | A | * | 3/1991 | Brown ........................ 248/74.1 |
| 5,215,281 | A | * | 6/1993 | Sherman ..................... 248/74.1 |
| 5,566,916 | A | * | 10/1996 | Bailey ........................ 248/230.1 |
| 6,041,823 | A |  | 3/2000 | Kusama |
| 7,073,755 | B2 | * | 7/2006 | Michaud et al. ............... 248/72 |
| 8,083,192 | B2 | * | 12/2011 | Wells et al. ................ 248/218.4 |
| 2002/0096610 | A1 | * | 7/2002 | Fernandez ................ 248/218.4 |
| 2006/0231706 | A1 | * | 10/2006 | Wyatt ........................ 248/218.4 |

FOREIGN PATENT DOCUMENTS

| CN | 1191921 A | 9/1998 |
| CN | 2775280 Y | 4/2006 |
| CN | 2924123 Y | 7/2007 |
| JP | 2004140015 A | 5/2004 |

OTHER PUBLICATIONS

International Search Report for PCT Patent Application No. PCT/CN2009/075606, mailed Mar. 25, 2010, 4 pages total.

* cited by examiner

*Primary Examiner* — Ramon Ramirez (57) ABSTRACT

In the field of communication technologies, a fixing device for a holding pole is provided, so as to solve the problem of increased mounting cost due to too much manpower occupied by mounting the fixing device for the holding pole. The fixing device for the holding pole includes a first fastener, a second fastener, and a securing member, two ends of the first fastener are radially engaged with two ends of the second fastener to form a ring, and the securing member rotatably runs through the first fastener or the second fastener to reach the inside of the ring.

20 Claims, 8 Drawing Sheets

FIXING DEVICE FOR A HOLDING POLE

CROSS-REFERENCE TO RELATED APPLICATIONS

This application is a continuation of International Application No. PCT/CN2009/075606, filed on Dec. 15, 2009, which claims priority to Chinese Patent Application No. 200810220168.8, filed on Dec. 19, 2008, both of which are hereby incorporated by reference in their entireties.

FIELD OF THE INVENTION

The present invention relates to the field of communications technologies, and in particular, to a fixing device for a holding pole applied to clamp the pole.

BACKGROUND OF THE INVENTION

An outdoor small communication module, such as a Remote Radio Unit (RRU), is generally mounted on a pole to be adapted to situations such as a park, a roof, an iron tower, and a hillside. Currently, in a manner for mounting a small communication module on a pole, a fixing device for a holding pole is first mounted on the pole to form a mounting base for mounting small communication equipment, and then the small communication equipment is fixed on the fixing device for the holding pole.

Figure 1:
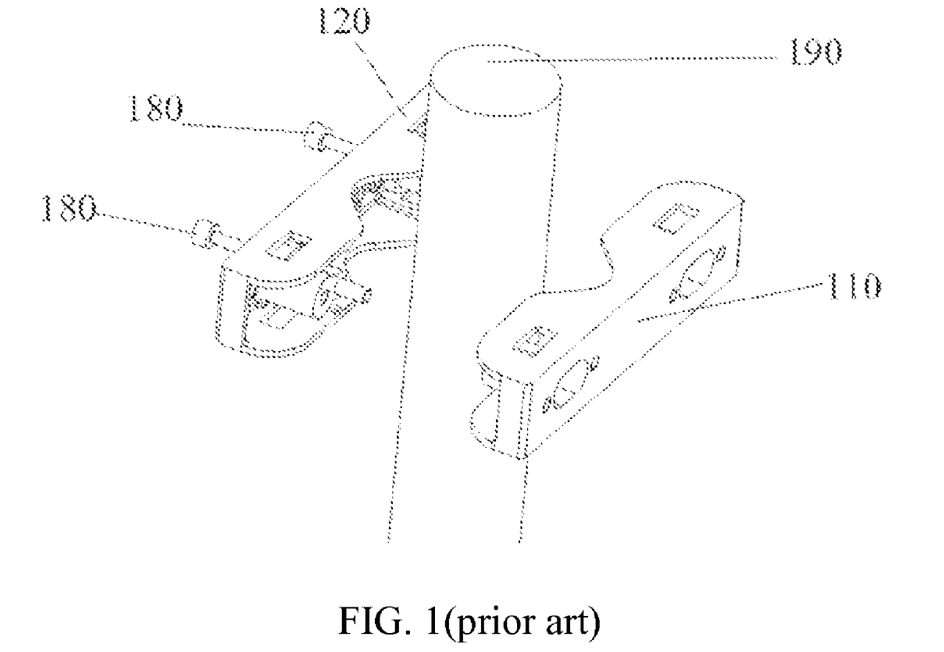
FIG. 1 is a schematic three-dimensional view of a fixing device for a holding pole mounted on the pole in the prior art.

FIG. 1 shows an existing manner of mounting a fixing device for a holding pole on the pole. As shown in FIG. 1, the fixing device for the holding pole includes a first fastener 110, a second fastener 120, and two screws 180. Both the first fastener 110 and the second fastener 120 are disposed with a V-shaped slot, and threaded holes are opened in two end portions of both the first fastener 110 and the second fastener 120. The V-shaped slot of the first fastener 110 corresponds to the V-shaped slot of the second fastener 120, and the two threaded holes of the first fastener 110 correspond to the two threaded holes of the second fastener 120. When the fixing device for the holding pole is mounted on the pole 190, a first operator levels the first fastener 110 and the second fastener 120, at the same time surrounds the pole 190 with the first fastener 110 and the second fastener 120 through the V-shaped slot of the first fastener 110 and the V-shaped slot of the second fastener 120, and adjusts the height of top surfaces of the first fastener 110 and the second fastener 120 to make sure that the V-shape slot of the first fastener 110 and the V-shaped slot of the second fastener 120 clamp the pole 190 and meanwhile the two threaded holes of the first fastener 110 are aligned with the two threaded holes of the second fastener 120. Then, a second operator screws the two screws 180 into the two threaded holes of the first fastener 110 and the corresponding threaded holes of the second fastener 120 to make the first fastener 110 and the second fastener 120 of the fixing device for the holding pole together clamp the pole 190.

In view of the above, two persons are required to perform the operation to make the fixing device for the holding pole clamp the pole 190. That is to say, the first operator levels the first fastener 110 and the second fastener 120, and adjusts the height of the top surfaces of the first fastener 110 and the second fastener 120. The second operator screws the two screws 180 into the two threaded holes of the first fastener 110 and the corresponding threaded holes of the second fastener 120 respectively to make the first fastener 110 and the second fastener 120 clamp the pole 190. The fixing device for the holding pole is operated by two persons, thereby occupying excessive manpower, which increases the mounting cost of the fixing device for the holding pole in a disguised manner.

SUMMARY OF THE INVENTION

The present invention is directed to a fixing device for a holding pole, so as to solve the problem of increased mounting cost due to excessive manpower occupied by mounting the fixing device for the holding pole in the prior art.

An embodiment of the present invention provides a fixing device for a holding pole, which includes a first fastener, a second fastener, and a securing member. Two ends of the first fastener are radially engaged with two ends of the second fastener to form a ring, and the securing member rotatably runs through the first fastener or the second fastener to reach the inside of the ring.

According to the technical solution, when the fixing device for the holding pole is mounted on the holding pole, the two ends of the first fastener are radially engaged with the two ends of the second fastener, and then the securing member runs through the first fastener and/or the second fastener to press against the holding pole. The fixing device for the holding pole makes it possible for one person to mount the fixing device for the holding pole, thereby reducing the mounting cost of the fixing device for the holding pole in the prior art.

BRIEF DESCRIPTION OF THE DRAWINGS

To make the technical solution of the present invention or the prior art more comprehensible, the accompanying drawings required to be used in the descriptions of the embodiments and the prior art are simply described below. Apparently, the accompanying drawings described below merely demonstrate some of the embodiments of the present invention. Based on the accompanying drawings, persons of ordinary skill in the art may obtain other accompanying drawings without creative efforts.

FIG. 8b is a schematic view illustrating the principle of mounting the fixing device for the holding pole in FIG. 8a.

DETAILED DESCRIPTION OF THE EMBODIMENTS

The technical solution of the present invention is clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 2:
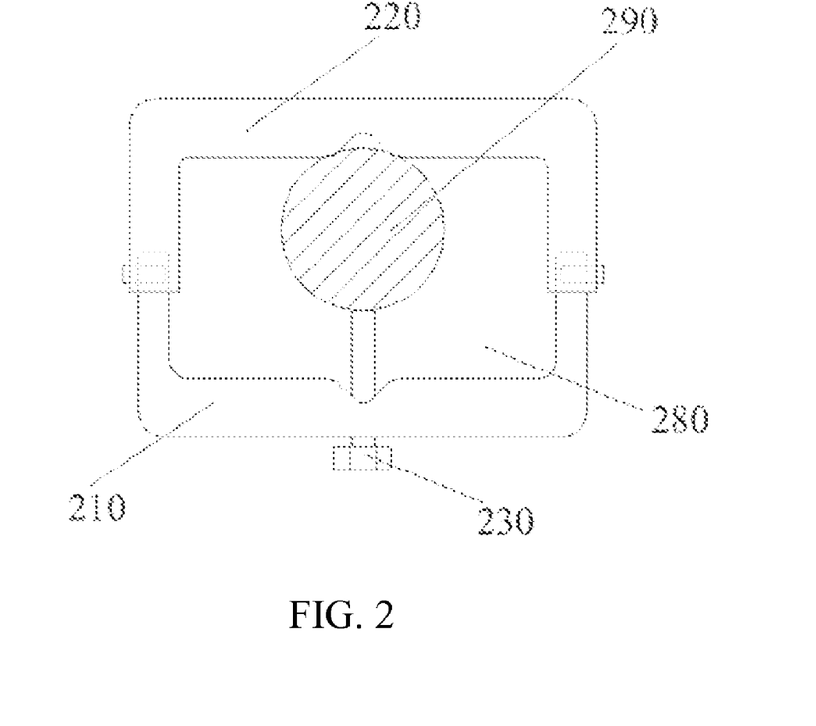
FIG. 2 is a top view of a fixing device for a holding pole mounted on the pole according to an embodiment of the present invention.

FIG. 2 is a top view of a fixing device for a holding pole mounted on the pole according to an embodiment of the present invention. As shown in FIG. 2, the fixing device for the holding pole includes a first fastener 210, a second fastener 220, and a securing member 230. Two ends of the first fastener 210 are radially engaged with two ends of the second fastener 220 to form a ring 280. The securing member 230 rotatably runs through the first fastener 210 or the second fastener 220 to reach the inside of the ring 280.

Still referring to FIG. 2, when an operator makes the second fastener 220 contact the pole 290 and makes the first fastener 210 move towards the pole 290, the two ends of the first fastener 210 are radially guided into the two ends of the second fastener 220 to make the first fastener 210 engaged with the second fastener 220. Then, the operator makes the securing member 230 run through the first fastener 210 or the second fastener 220 to press against the pole 290. In this manner, the fixing device for the holding pole is mounted on the pole 290.

In view of the above, when the fixing device for the holding pole is mounted on the holding pole 290, the two ends of the first fastener 210 are radially engaged with the two ends of the second fastener 220, and then the securing member 230 runs through the first fastener 210 or the second fastener 220 to press against the holding pole 290. The fixing device for the holding pole makes it possible for one person to mount the fixing device for the holding pole, thereby reducing the mounting cost of the fixing device for the holding pole.

The securing member 230 may be a screw.

Figure 3:
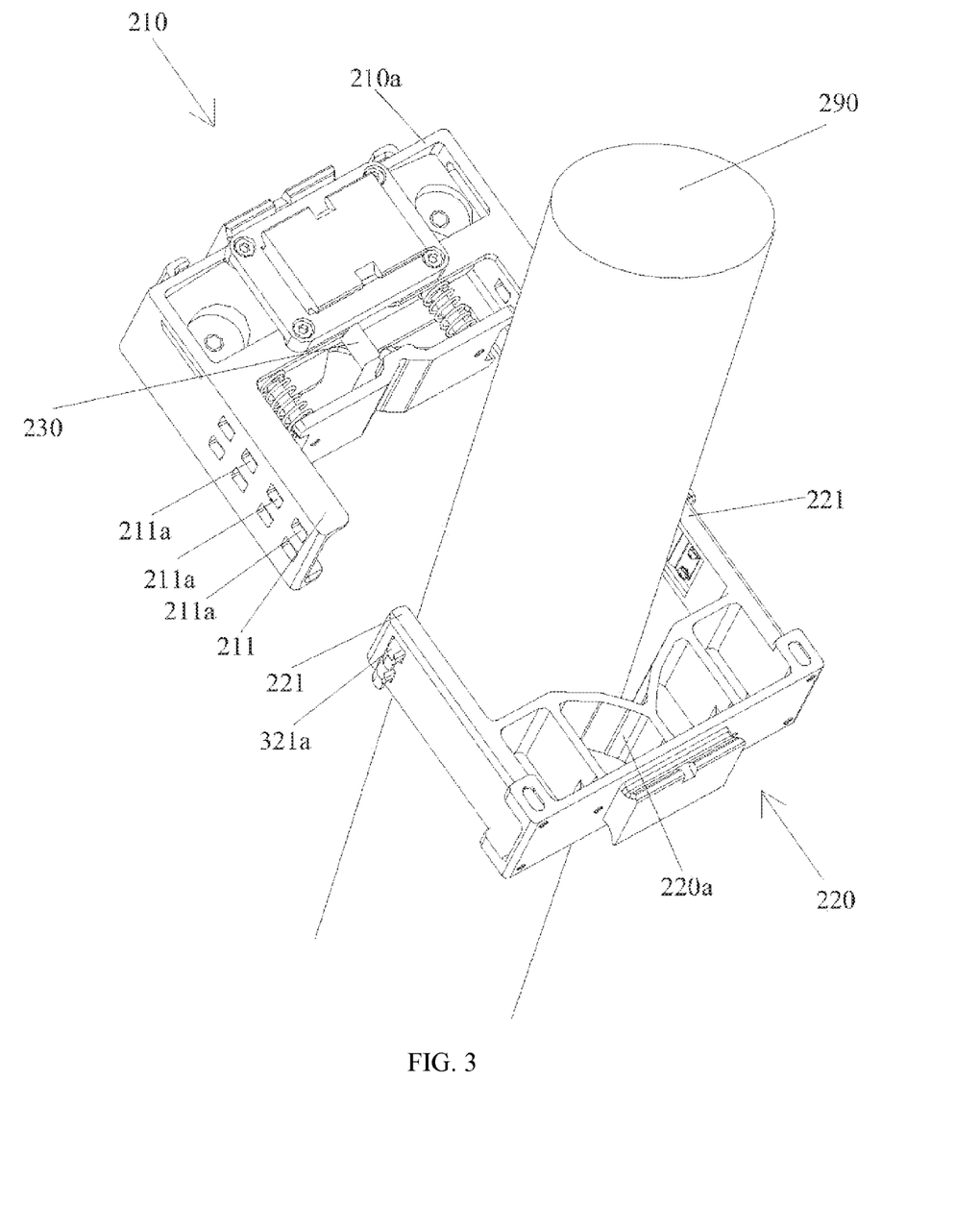
FIG. 3 is an assembly state diagram of a fixing device for a holding pole mounted on the pole according to a first embodiment of the present invention.

Referring to FIG. 3, the first fastener 210 includes a first main body 210a and guiding structural members extending outwards along two ends of the first main body 210a; the second fastener 220 includes a second main body 220a and protruding structural members extending outwards along two ends of the second main body 220a; and the guiding structural members are engaged with the protruding structural members. The securing member 230 rotatably runs through the first main body 210a.

Still referring to FIG. 3, the guiding structural member is a bar-shaped recessed portion 211, and the protruding structural member is a bar-shaped protrusion 221. The bar-shaped recessed portion 211 is opened with first through holes 211a, and the bar-shaped protrusion 221 is disposed with retaining blocks 321a. The retaining block 321a may be engaged with the first through hole 211a.

When the first fastener 210 and the second fastener 220 are mounted on the pole 290, the operator makes the second fastener 220 contact the pole 290, and makes the first fastener 210 move towards the pole 290. The bar-shaped protrusion 221 of the second fastener 220 may slide along the bar-shaped recessed portion 211, and the retaining block 321a of the bar-shaped protrusion 221 may be engaged with the first through hole 211a of the bar-shaped recessed portion 211. Then, the operator rotates the securing member 230 rotatably disposed on the first main body 210a to make the securing member 230 press against the pole 290, so that the first fastener 210 and the second fastener 220 are mounted on the pole 290.

Figure 5A:
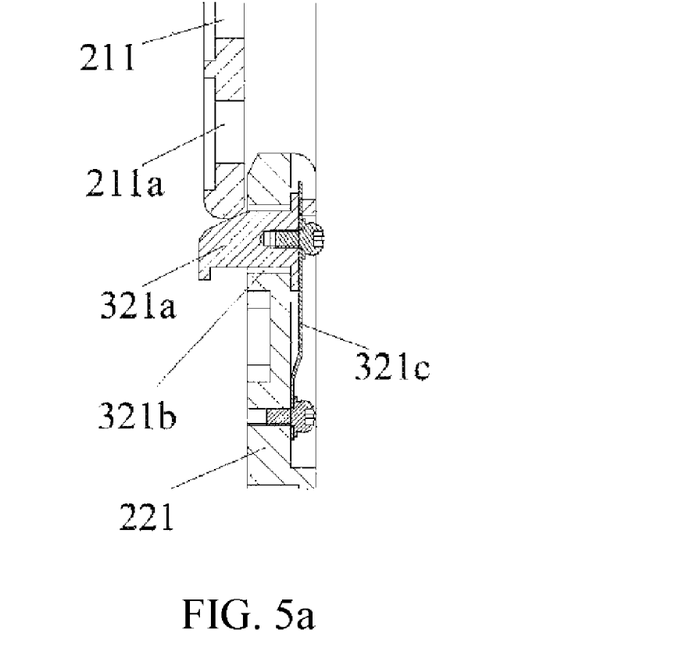
FIG. 5a is an enlarged view of a part B in FIG. 4.

Referring to FIG. 5a, the bar-shaped protrusion 221 is disposed with the retaining block 321a.

Specifically, the retaining block 321a is fixedly disposed on the bar-shaped protrusion 221 through an elastic element 321c.

Furthermore, the bar-shaped protrusion 221 is opened with second through holes 321b. One end of the elastic element 321c is fixedly disposed on the bar-shaped protrusion 221, and the other end of the elastic element 321c is fixedly disposed on the retaining block 321a. The retaining block 321a is received by the second through hole 321b, and protrudes out of the second through hole 321b.

Figure 5B:
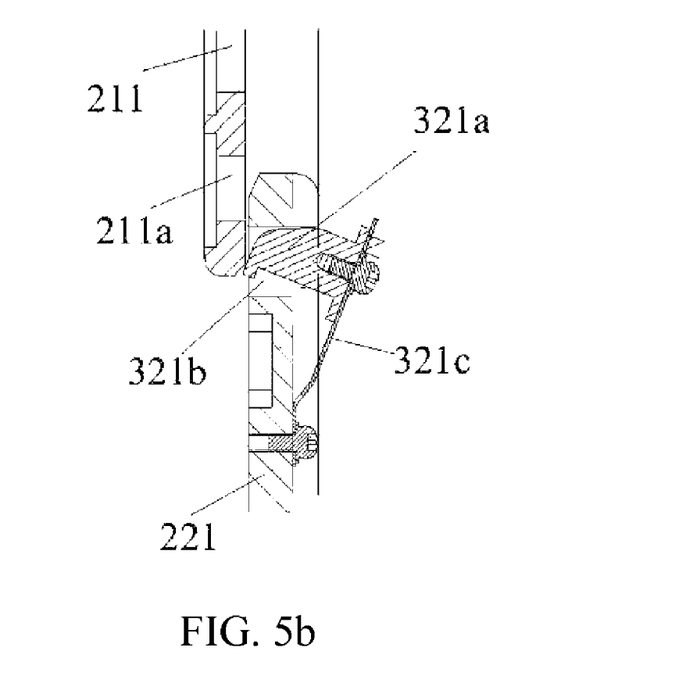
FIG. 5b is another enlarged view of the part B in FIG. 4.
Figure 5C:
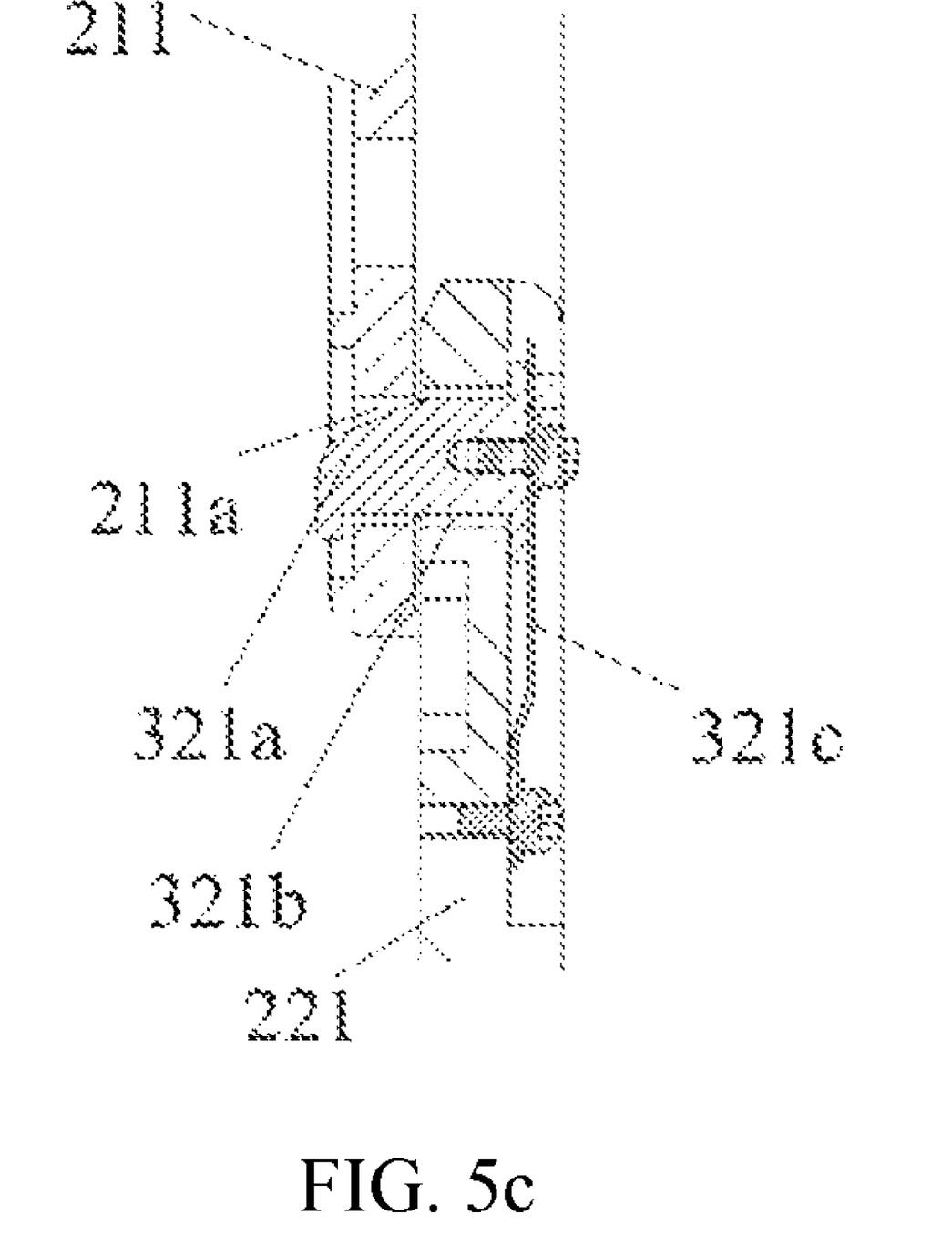
FIG. 5c is another enlarged view of the part B in FIG. 4.

Referring to FIG. 5b, the operator makes the first fastener 210 move towards the second fastener 220 so that the bar-shaped protrusion 221 of the second fastener 220 slides along the bar-shaped recessed portion 211, the bar-shaped recessed portion 211 presses against the retaining block 321a protruding out of the second through hole 321b to make the retaining block 321a withdraw into the second through hole 321b, and during withdrawing, the retaining block 321a presses against the elastic element 321c. Referring to FIG. 5c, the operator makes the first fastener 210 continue moving towards the second fastener 220, and makes the first through hole 211a of the bar-shaped recessed portion 211 aligned with the retaining block 321a, and at this time, the pressed elastic element 321c pushes the retaining block 321a into the second through hole 321b to be engaged with the first through hole 211a. In this manner, the two ends of the first fastener 210 are radially engaged with the two ends of the second fastener 220.

Figure 4:
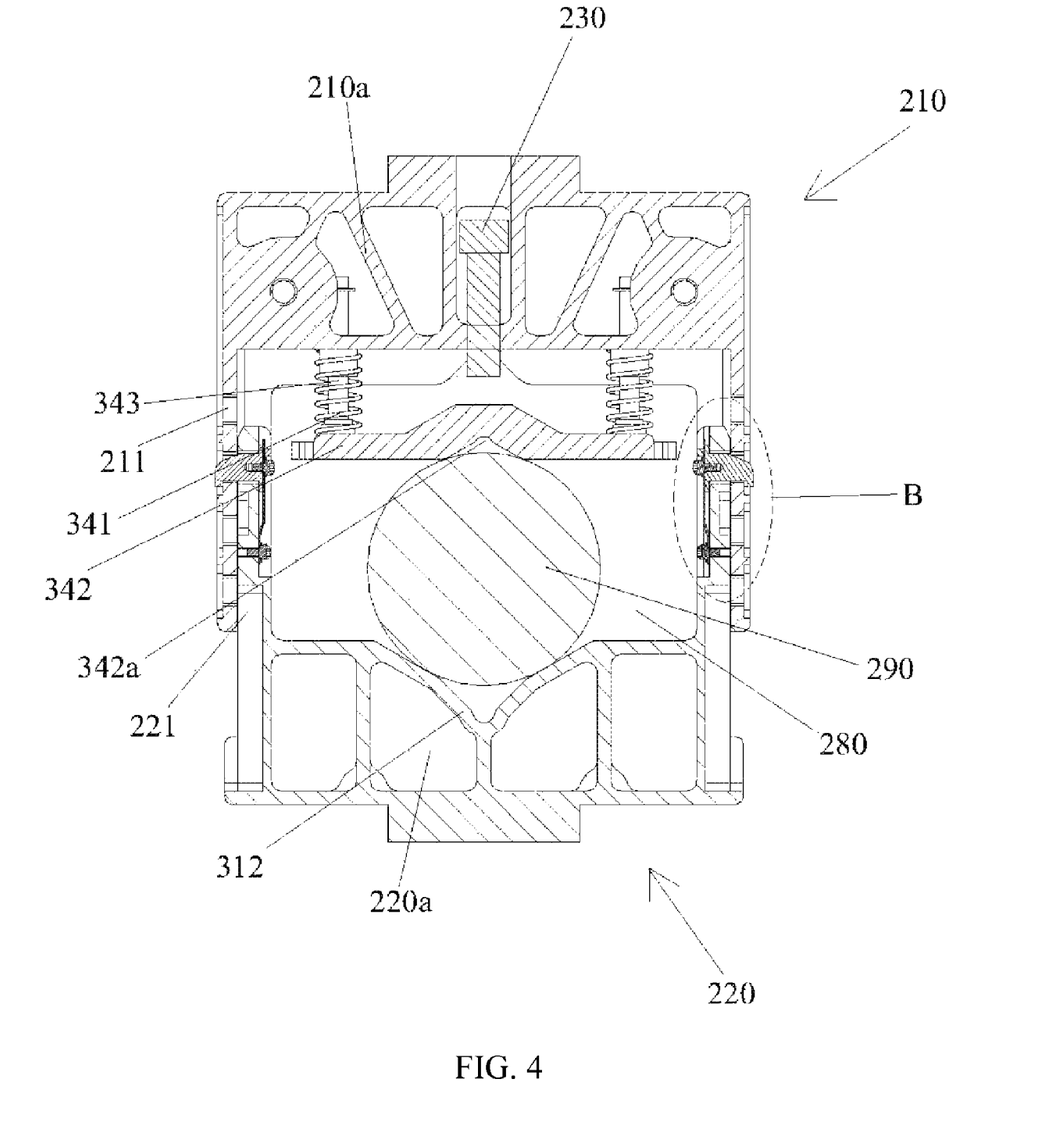
FIG. 4 is a schematic sectional view of the fixing device for the holding pole mounted on the pole in FIG. 3.

Referring to FIG. 4, the fixing device for the holding pole further includes springs 341 and a slide block 342 located in the ring 280. One end of the spring 341 is fixed on the first main body 210a, and the other end of the spring 341 is fixed on the slide block 342. After the first fastener 210 is engaged with the second fastener 220, the securing member 230 rotatably runs through the first main body 210a and presses against the slide block 342, and at the same time, the slide block presses against the pole 290.

The slide block 342 are slidably disposed at the bar-shaped recessed portions 211.

Still referring to FIG. 4, the fixing device for the holding pole further includes guide rods 343. The guide rod 343 runs through the spring 341, one end of the guide rod 343 is fixed on the slide block 342, and the other end of the guide rod 343 is slidably disposed inside the first main body 210a. The guide rod 343 guides the spring 341 to extend and retract between the first fastener 210 and the slide block 342, so as to be adapted to the holding pole 290 of different diameters.

In view of the above, when the fixing device for the holding pole is mounted on the holding pole 290, the two ends of the first fastener 210 are radially engaged with the two ends of the second fastener 220, and then the securing member 230 runs through the first fastener 210 to press against the slide block 342, so that the slide block 342 presses against the holding pole 290. The fixing device for the holding pole makes it possible for one person to mount the fixing device for the holding pole, thereby reducing the mounting cost of the fixing device for the holding pole.

Figure 6:
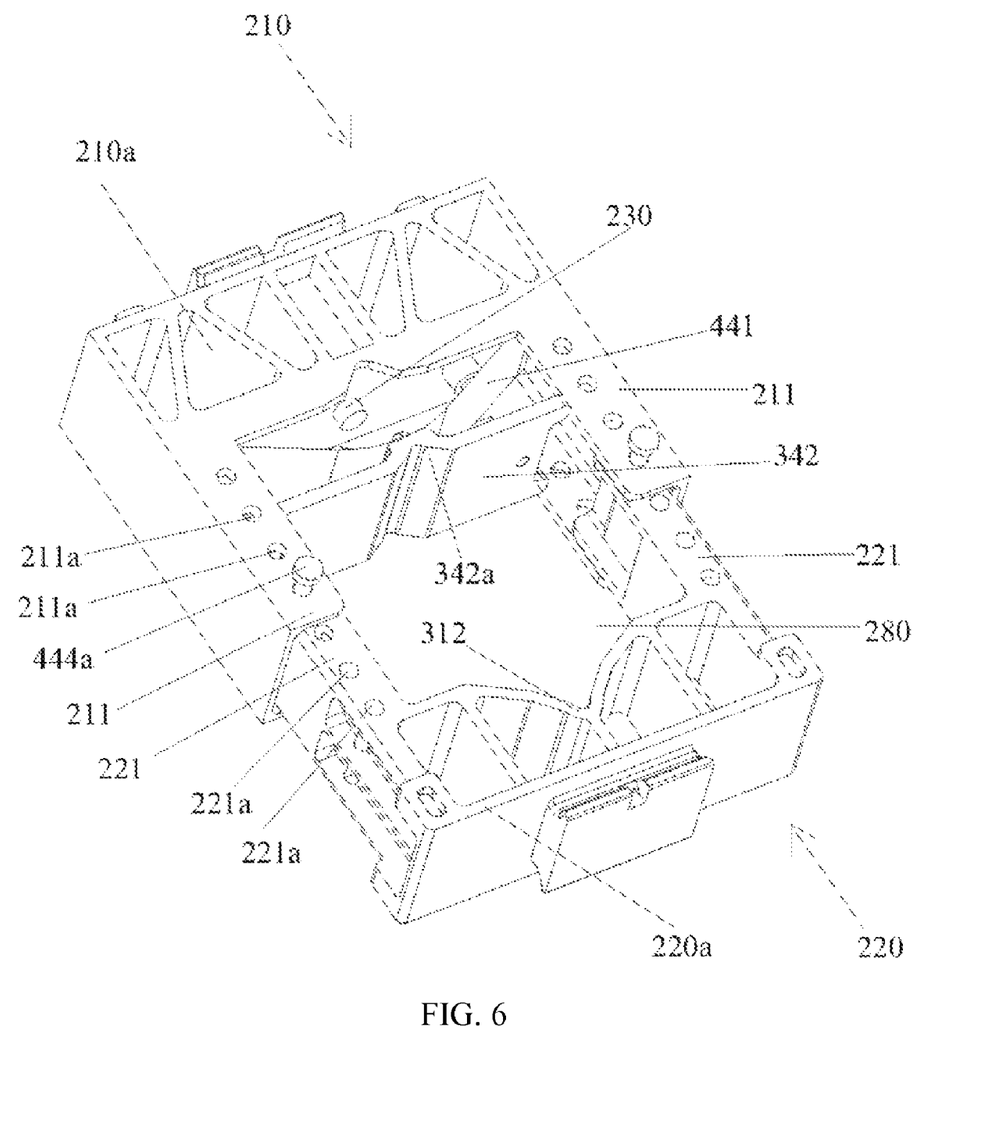
FIG. 6 is a three-dimensional view of a fixing device for a holding pole according to a second embodiment of the present invention.

Referring to FIG. 6, according to a second embodiment of the present invention, the guiding structural member is the bar-shaped recessed portion 211, the bar-shaped recessed portion 211 is opened with the first through holes 211a, the bar-shaped protrusion 221 is opened with third through holes 221a, and the first through hole 211a is connected to the third through hole 221a through a connecting member 444a. The operator makes the first fastener 210 move towards the second fastener 220, and the bar-shaped protrusion 221 of the second fastener 220 may slide along the bar-shaped recessed portion 211. During sliding, the operator makes the third through hole 221a of the bar-shaped protrusion 221 aligned with the first through hole 211a of the bar-shaped recessed portion 211, and then makes the connecting member 444a run through the first through hole 211a and the third through hole 221a, so that the two ends of the second fastener 220 are radially engaged with the two ends of the first fastener 210.

It can be understood that, the connecting member 444a may be a pin.

Referring to FIG. 6, the fixing device for the holding pole further includes an elastic plate 441 and the slide block 342 located in the ring 280. Two end portions of the elastic plate 441 are fixed on the two ends of the first main body 210a respectively, and a middle portion of the elastic plate 441 is fixed on the slide block 342. The two ends of the slide block 342 are slidably disposed at the bar-shaped recessed portions 211. After the first fastener 210 is engaged with the second fastener 220, the securing member 230 rotatably runs through the first main body 210a to press against the elastic plate 441 and further presses against the slide block 342, and at the same time, the slide block presses against the pole 290.

In view of the above, when the fixing device for the holding pole is mounted on the holding pole 290, the two ends of the first fastener 210 are radially engaged with the two ends of the second fastener 220, and then the securing member 230 runs through the first fastener 210 to press against the elastic plate 441 and further presses against the slide block 342, so that the slide block 342 presses against the holding pole 290. The fixing device for the holding pole makes it possible for one person to mount the fixing device for the holding pole, thereby reducing the mounting cost of the fixing device for the holding pole.

Figure 7:
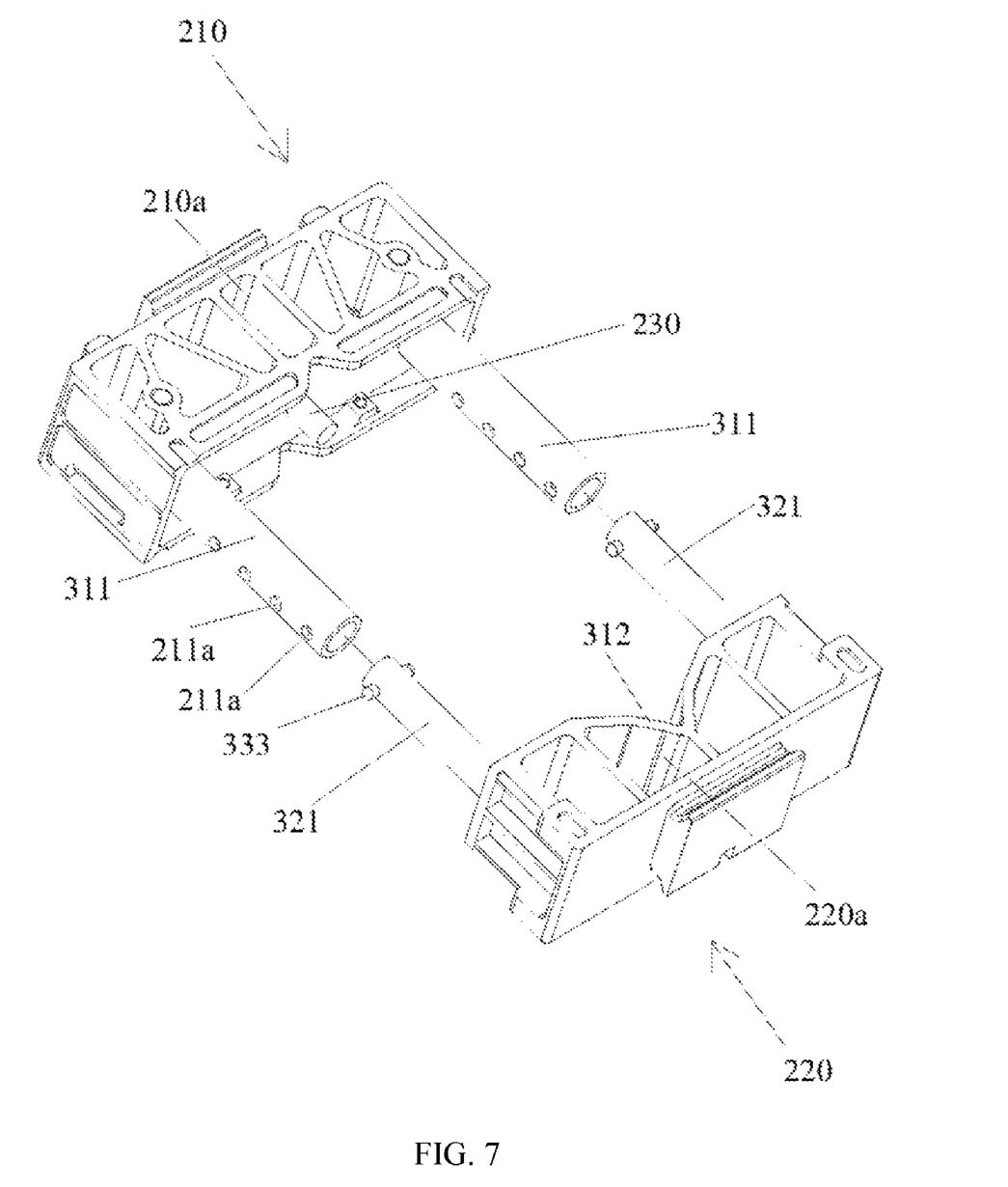
FIG. 7 is a three-dimensional view of a fixing device for a holding pole according to a third embodiment of the present invention.

Referring to FIG. 7, according to a third embodiment of the present invention, the guiding structural member is a shaft sleeve 311, and the protruding structural member is a shaft 321.

Still referring to FIG. 7, the shaft sleeve 311 is opened with the first through holes 211a, and the shaft 321 is disposed with engagement mechanisms 333. The engagement mechanism 333 can be engaged with the first through hole 211a.

The engagement mechanism 333 may be a resilient button.

In view of the above, in the embodiment of the present invention, the shaft 321 of the second fastener 220 of the fixing device for the holding pole slides along the shaft sleeve 311 of the first fastener 210, and is engaged with the first through hole 211a through the resilient button. Then, the securing member 230 is rotated to press against the pole. In this manner, the embodiment of the present invention makes it possible for one person to mount the fixing device for the holding pole, thereby reducing the mounting cost of the fixing device for the holding pole.

Figure 8A:
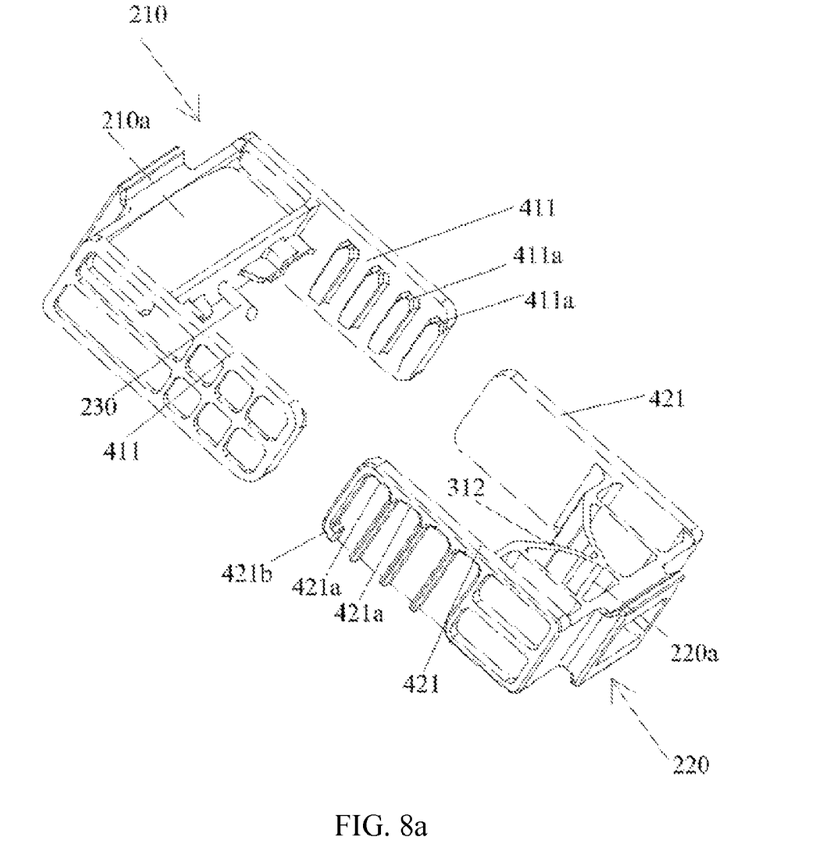
FIG. 8a is a three-dimensional view of a fixing device for a holding pole according to a fourth embodiment of the present invention.

Referring to FIG. 8, according to a fourth embodiment of the present invention, the first fastener 210 includes the first main body 210a and first protruding structural members 411 extending outwards along the two ends of the first main body 210a. An inner side of the first protruding structural member 411 is disposed with protrusions 411a. The second fastener 220 includes the second main body 220a and second protruding structural members 421 extending outwards along the two ends of the second main body 220a. An outer side of the second protruding structural member 421 is opened with recessed portions 421a. The protrusion 411a may be received in the recessed portion 421a.

An edge of the recessed portion 421a is bent inwards to form a hook 421b.

Figure 8B:
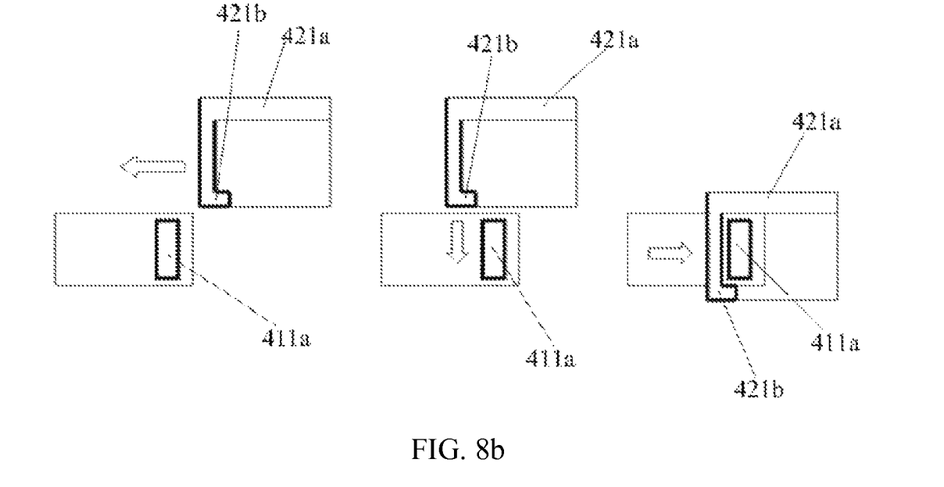

As shown in FIG. 8b, the operator makes the second fastener 220 move towards the first fastener 210, and makes the recessed portion 421a of the second protruding structural member 421 aligned with the protrusion 411a of the first protruding structural member 411. At this time, the operator makes the second protruding structural member 421 engaged with the protrusion 411a through the recessed portion 421a, and then makes the hook 421b of the recessed portion 421a move towards the protrusion 411a to be engaged with the protrusion 411a. In this manner, the two ends of the second fastener 220 are radially engaged with the two ends of the first fastener 210.

In view of the above, in the embodiment of the present invention, after the recessed portion 421a of the second fastener 220 of the fixing device for the holding pole is engaged with the protrusion 411a of the first fastener 210, the securing member 230 is rotated to press against the pole. In this manner, the embodiment of the present invention makes it possible for one person to mount the fixing device for the holding pole, thereby reducing the mounting cost of the fixing device for the holding pole.

It should be noted that, as shown in FIGS. 4, 6, 7, and 8a, the second main body 220a of the second fastener 220 may be disposed with a V-shaped slot 312. As shown in FIGS. 4 and 6, the slide block 342 may be disposed with a V-shaped slot 342a. The V-shaped slot 312 and the V-shaped slot 342a increase the contact area when the pole 290 presses against the second fastener 220 and the slide block 342, so as to more tightly hold the pole 290.

The above descriptions are merely preferred embodiments of the present invention, but not intended to limit the scope of the present invention. Any equivalent variation made according to the claims of the present invention shall fall within the scope of the present invention.

We claim:

1. A fixing device for a holding pole, comprising:
a first fastener;
a second fastener; and
a securing member, wherein two ends of the first fastener are radially engaged with two ends of the second fastener to form a ring, and the securing member rotatably runs through the first fastener or the second fastener to reach the inside of the ring for securely holding a pole therein;
wherein the first fastener comprises a first main body and at least one guiding structural member extending outwards along at least one of two ends of the first main body;
the second fastener comprises a second main body and at least one protruding structural member extending outwards along at least one of two ends of the second main body; and
each protruding structural member engages with a guiding structural member in order to radially engage the two ends of the first fastener with the two ends of the second fastener in forming the ring.

2. The fixing device for the holding pole according to claim 1, wherein:
at least one guiding structural member is a bar-shaped recessed portion with one or more through holes;
at least one protruding structural member is a bar-shaped protrusion disposed with one or more retaining blocks; and
the one or more retaining blocks engage with the one or more through holes for securing the first and second main bodies together and radially engaging at least one of the two ends of the first fastener with at least one of the two ends of the second fastener in forming the ring.

3. The fixing device for the holding pole according to claim 2, wherein the bar-shaped protrusion of the at least one protruding structural member includes one or more through holes for receiving the one or more retaining blocks through such that a protruding end of the one or more retaining blocks extends out of the one or more through holes in an extended position and an opposing end is flexibly attached to the bar-shaped protrusion by an elastic element that allows the protruding end to be forcibly pushed down through the one or more through holes and return to the extended position in the absence of force and further allows the protrusion end to easily engage with the one or more through holes of the at least one guiding structural member for securing the first and second main bodies together and radially engaging at least one of the two ends of the first fastener with at least one of the two ends of the second fastener in forming the ring.

4. The fixing device for the holding pole according to claim 2, further comprising:
one or more springs with one end thereof is attached to the first main body; and
a slide block slidably disposed within the ring at the bar-shaped recessed portion of the at least one guiding structural member and attached to the other end of the one or more springs thereto, wherein the one or more springs allow the slide block to extend and retract in adapting the fixing device for holding poles of different diameters and making it possible for one person to mount the fixing device to a pole by applying a force that presses the slide block against the pole when engaging at least one of the two ends of the first fastener with at least one of the two ends of the second fastener in forming the ring.

5. The fixing device for the holding pole according to claim 4, further comprising:
one or more guide rods slidebly disposed through the springs with one end of the one or more guide rods attached to the slide block and the other end of the one or more guide rods is slidably disposed inside the first main body for guiding the spring when extending and retracting between the first fastener and the slide block so as to be adapted to hold poles of different diameters.

6. The fixing device for the holding pole according to claim 2, further comprising:
a flexible plate with at least one end thereof fixed on the main body; and
a slide block slidably disposed within the ring at the bar-shaped recessed portion of the at least one guiding structural member and attached to a section of the flexible plate thereto, wherein the flexible plate allows the slide block to extend and retract in adapting the fixing device for holding poles of different diameters and making it possible for one person to mount the fixing device to a pole by applying a force that presses the slide block against the pole when engaging at least one of the two ends of the first fastener with at least one of the two ends of the second fastener in forming the ring.

7. The fixing device for the holding pole according to claim 6, wherein the section of the flexible plate attached to the side plate is a middle portion, and wherein the flexible plate includes two ends fixed on opposite sides of the main body adjacent to the two ends of the first fastener.

8. The fixing device for the holding pole according to claim 1, wherein:
the at least one guiding structural member includes a shaft sleeve with one or more through holes disposed therein;
the at least one protruding structural member includes a shaft disposed with one or more engagement mechanisms; and
the at least one protruding structural member engages with the at least one guiding structural member through insertion therein and connection of the one or more engagement mechanisms with the one or more through holes.

9. The fixing device for the holding pole according to claim 1, wherein at least one guiding structural member is a bar-shaped recessed portion with one or more through holes, at least one protruding structural member is a bar-shaped protrusion with one or more through holes, and a through hole of the at least one guiding structural member connects to a through hole of the at least one protruding structural member through a connecting member for securing the first and second main bodies together and radially engaging at least one of the two ends of the first fastener with at least one of the two ends of the second fastener in forming the ring.

10. The fixing device for the holding pole according to claim 1, wherein the first fastener comprises a first main body and at least one first protruding structural member extending outwards along at least one of the two ends of the first main body, and an inner side of the at least one first protruding structural member is disposed with one or more protrusions; the second fastener comprises a second main body and at least one second protruding structural member extending outwards along at least one of two ends of the second main body, and an outer side of the at least one second protruding structural member includes one or more recessed portions; and the one or more protrusion is received in the one or more recessed portion for securing the first and second main bodies together and radially engaging at least one of the two ends of the first fastener with at least one of the two ends of the second fastener in forming the ring.

11. The fixing device for the holding pole according to claim 10, wherein the second main body of the second fastener is disposed with a V-shaped slot for increasing the contact area when the pole presses against the second fastener, so as to more tightly hold the pole.

12. The fixing device for the holding pole according to claim 10, wherein an edge of the recessed portion is bent inwards to form a hook.

13. A method for mounting a fixing device to a pole, comprising:
securing a first fastener with a second fastener by radially guiding at least one of two ends of the first fastener into at least one of two ends of the second fastener to form a ring;
rotating a securing member that runs through the first fastener or the second fastener in order to press against a pole for mounting the fixing device thereon;
wherein the first fastener comprises a first main body and at least one guiding structural member extending outwards along at least one of two ends of the first main body and the second fastener comprises a second main body and at least one protruding structural member extending outwards along at least one of two ends of the second main body, and wherein the act for securing the first fastener with the second fastener further comprises:
engaging each protruding structural member with a guiding structural member in order to radially engage the two ends of the first fastener with the two ends of the second fastener in forming the ring.

14. The method according to claim 13, wherein at least one guiding structural member is a bar-shaped recessed portion with one or more through holes and at least one protruding structural member is a bar-shaped protrusion disposed with one or more retaining blocks, and wherein the act for securing the first fastener with the second fastener further comprises:
engaging the one or more retaining blocks with the one or more through holes for radially engaging at least one of the two ends of the first fastener with at least one of the two ends of the second fastener in forming the ring.

15. The method according to claim 14, wherein the bar-shaped protrusion of the at least one protruding structural member includes one or more through holes for receiving the one or more retaining blocks such that a protruding end of the one or more retaining blocks extends out of the one or more through holes in an extended position and an opposing end is flexibly attached to the bar-shaped protrusion by an elastic element, and wherein the act for engaging the one or more retaining blocks with the one or more through holes further comprises:
forcibly pushing the protruding end the one or more retaining blocks down through the one or more through holes of the bar-shaped protrusion;
radially engaging at least one of the two ends of the first fastener with at least one of the two ends of the second fastener in forming the ring; and
releasing said force on the protruding end of the one or more retaining blocks for engaging the protrusion end with the one or more through holes of the bar-shaped recessed portion when the protruding end returns to the extended position in the absence said force.

16. The method according to claim 14, wherein one or more springs with one end thereof is attach to the first main body, and a slide block is slidably disposed within the ring at the bar-shaped recessed portion of the at least one guiding structural member and attached to the other end of the one or more springs thereto, the method further comprises:
extending and retracting the slide block by the one or more springs in adapting the fixing device for holding poles of different diameters and making it possible for one person to mount the fixing device to a pole by applying a force that presses the slide block against the pole when engaging at least one of the two ends of the first fastener with at least one of the two ends of the second fastener in forming the ring.

17. The method according to claim 14, wherein at least one end of a flexible plate is fixed on the main body and a slide block is slidably disposed within the ring at the bar-shaped recessed portion of the at least one guiding structural member and attached to a section of the flexible plate thereto, the method further comprises:
extending and retracting the slide block by the flexible plate in adapting the fixing device for holding poles of different diameters and making it possible for one person to mount the fixing device to a pole by applying a force that presses the slide block against the pole when engaging at least one of the two ends of the first fastener with at least one of the two ends of the second fastener in forming the ring.

18. The method according to claim 13, wherein at least one guiding structural member is a bar-shaped recessed portion with one or more through holes, at least one protruding structural member is a bar-shaped protrusion with one or more through holes, and wherein
the act for securing the first fastener with the second fastener further comprises:
connecting a through hole of the at least one guiding structural member with a through hole of the at least one protruding structural member through a connecting member for securing the first and second main bodies together and radially engaging at least one of the two ends of the first fastener with at least one of the two ends of the second fastener in forming the ring.

19. The method according to claim 13, wherein the first fastener comprises a first main body and at least one first protruding structural member extending outwards along at least one of the two ends of the first main body, and an inner side of the at least one first protruding structural member is disposed with one or more protrusions; the second fastener comprises a second main body and at least one second protruding structural member extending outwards along at least one of two ends of the second main body, and an outer side of the at least one second protruding structural member includes one or more recessed portions, and wherein the act for securing the first fastener with the second fastener comprises:
inserting the one or more protrusions into a corresponding section of the one or more recessed portions for radially engaging at least one of the two ends of the first fastener with at least one of the two ends of the second fastener in forming the ring.

20. The fixing device for the holding pole according to claim 19, wherein an edge of the one or more recessed portions is bent inwards to form a hook, and wherein the act for inserting the one or more protrusions into a corresponding section of the one or more recessed portions includes:
hooking the one or more reassessed portion around the one or more protrusion portions.

* * * * *